S. & D. HARRIS.
Horse Hay Fork.
No. 2,987.
Reissued June 16, 1868.
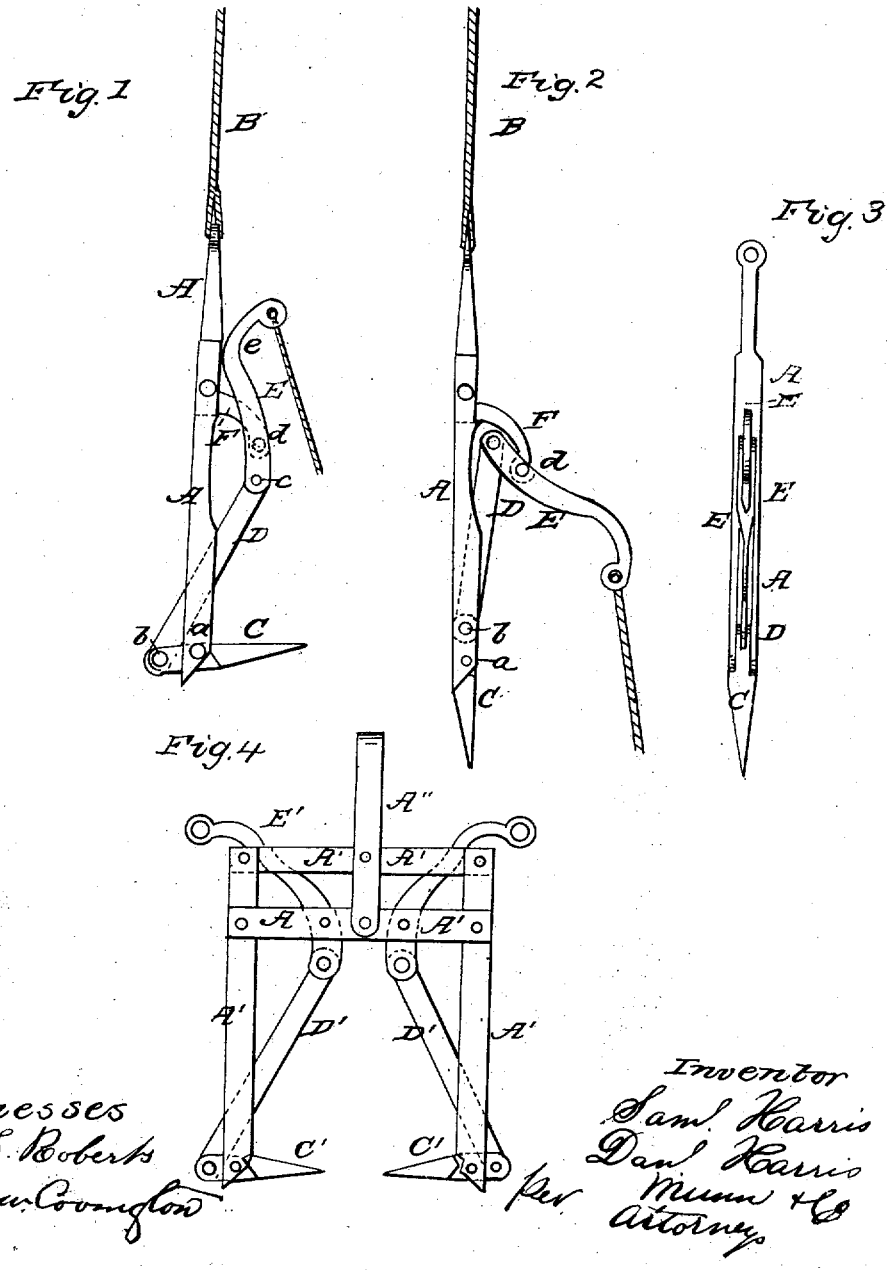
N. PETERS, Photo-Lithographer, Washington, D. C.

United States Patent Office.

SAMUEL HARRIS AND DANIEL A. HARRIS, OF SHIPPENSBURG, PENNSYLVANIA.

*Letters Patent No.* 64,100, *dated April* 23, 1867; *reissue No.* 2,987, *dated June* 16, 1868.

IMPROVEMENT IN HORSE HAY-FORKS.

The Schedule referred to in these Letters Patent and making part of the same.

TO ALL WHOM IT MAY CONCERN:

Be it known that we, SAMUEL HARRIS and DANIEL A. HARRIS, both of Shippensburg, in the county of Cumberland, and State of Pennsylvania, have invented certain new and useful Improvements in Horse Hay-Forks, of which the following is a full, clear, and exact description, reference being had to the accompanying drawings, which make part of this specification, and in which—

Figure 1 represents a view in elevation of one side of a hay-fork, embracing our improvements, the parts being shown in the positions they occupy while lifting the hay.

Figure 2 represents a similar view of the same, as it appears when penetrating into the hay.

Figure 3 represents a view of fig. 2, as seen from the front.

Figure 4 represents a double fork, constructed according to our improved plan, the parts being shown in the positions they assume when ready to lift the load.

Our invention relates to that class of hay-forks known as harpoon-forks.

The improvements herein claimed consist—

First, in a novel method of combining a slotted main bar or shank with a pivoted finger moving vertically in the slot at the lower end of the shank; a rod or link attached to the pivoted finger, and passing diagonally through the slot in the shank; and a forked locking-lever pivoted to a projection on the main bar or shank, whereby the pivoted finger is automatically locked (without the use of a bolt or catch) while lifting the hay, and easily unlocked to drop the hay.

Second, in a novel method of combining two parallel shanks, rigidly connected near their upper ends with pivoted fingers attached to their lower ends, which fingers point towards each other when brought into a horizontal position, as in lifting the load, whereby larger loads can be lifted and a better balance preserved than with a single fork.

Third, in a novel method of combining a compressing and bracing cross-bar with rigidly-connected shanks and with pivoted lifting-fingers connected with the locking-levers by means of link-rods crossing the shanks diagonally, whereby the hay is compressed between the lifting-fingers, the cross-bar, and the link-rods, before being elevated.

In figs. 2 and 3 of the accompanying drawings, the main bar or shank A is shown as formed with an eye at its upper end, for the attachment of a hoisting-rope, B. The harpoon or finger C plays vertically on a pivot, *a*, near its centre, in a slot in the lower part of the shank. The lower end of a link-rod, D, is connected by a pin, *b*, with the blunt end of the finger C, while a pin, *c*, connects its upper end with a curved lever, E, the lower end of which is forked to embrace the link-rod, and also a bar, F, to which the lever E is pivoted by a pin, *d*.

The tripping-rope is attached to the upper end of the lever E. The link-rod D and lever E thus form a toggle-joint.

When the finger C is horizontal, as in lifting the load, the joint *c* is outside of a line drawn from the point *b* to the point *d*, while the curve *e* of the lever abuts against the shank A. The consequence is that the weight of the load holds the parts in this position, and thus keeps the finger locked, while lifting, without the use of a spring or detent.

To discharge the load, the toggle-joint is flexed by pulling the tripping-rope, and drawing the lever E into the position shown in figs. 2 and 3.

In fig. 4 we have shown the same principle combined in a double fork. In this instance the frame A′ A′ A′ A′ takes the place of the bar or shank A, shown in the other figures. This frame is composed of two straight parallel shanks, firmly united near their upper ends by two cross-braces.

The hoisting-rope is attached to a loop, A″, affixed to the cross-braces. The pivoted fingers C′ are connected by link-rods D′ to levers E′, pivoted to the lower cross-brace.

The curvature of the levers E′, it will be observed, is the reverse of that shown in the other figures, so that in locking the pivoted fingers in a horizontal position, the levers move away from the hoisting-rope, instead of towards it, and, in tripping, their upper ends are lifted towards the hoisting-rope, instead of being drawn down from it.

The link-rods D′, it will be observed, cross the shanks A′ A′ diagonally from outside to inside.

In descending into the hay, the fingers C′ are vertical and rigid, and the link-rods D′ lie close to and nearly parallel with the cross-bars A′ A′. The entire space between the shanks and the lower cross-bar (A′ A′ A′) may be filled with hay, as the fingers may be pressed into the hay until the cross-bar A′ has compressed the hay firmly. As the fingers C′ are brought up horizontally, before lifting the load, their points approach close together, at the same time the link-rods D′ move inwards, and the hay is compressed both upwards by the fingers, downwards by the cross-bar A′, and inwards by the link-rods, thus forming a compact bundle, and preventing it from scattering.

This compression from all four directions is peculiarly effective and valuable in fine, dry, and short hay, which could not be advantageously handled with a hay-fork that did not afford this quadrilateral compression.

What we claim as our invention, is—

1. The combination, substantially as set forth, in a horse hay-fork, of a slotted main bar or shank, A, a lifting-finger, C, pivoted centrally in the slot of the shank, and a link-rod, D, connecting the finger with a forked lever, E, pivoted to an arm, F, projecting from the shank, and having the tripping-rope attached to its upper end, whereby the lifting-finger is automatically locked in a horizontal position by the weight of the load.

2. The combination, substantially as set forth, in a horse hay-fork, of two parallel rigidly-connected shanks, with pivoted fingers, for the purposes specified.

3. The combination, substantially as set forth, of the parallel shanks, the pivoted lifting-fingers, the link-rods crossing the shanks diagonally, and the cross-bar A′, whereby the load is compressed before being elevated.

SAM'L HARRIS,
DAN'L A. HARRIS.

Witnesses:
J. M. MEANS,
J. F. GIVLER.